United States Patent
Santoro et al.

(10) Patent No.: US 8,090,347 B2
(45) Date of Patent: Jan. 3, 2012

(54) METHOD AND RADIO COMMUNICATION NETWORK FOR DETECTING THE PRESENCE OF FRAUDULENT SUBSCRIBER IDENTITY MODULES

(75) Inventors: Pompeo Santoro, Baronissi (IT); Mario Claps, Salerno (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 405 days.

(21) Appl. No.: 11/570,119

(22) PCT Filed: Jun. 8, 2004

(86) PCT No.: PCT/EP2004/006446
§ 371 (c)(1),
(2), (4) Date: Dec. 6, 2006

(87) PCT Pub. No.: WO2005/122618
PCT Pub. Date: Dec. 22, 2005

(65) Prior Publication Data
US 2007/0270127 A1    Nov. 22, 2007

(51) Int. Cl.
*H04M 1/66* (2006.01)
(52) U.S. Cl. .................. 455/410; 455/411; 455/435.1; 455/426.1; 455/515
(58) Field of Classification Search .............. 455/410, 455/411, 433, 435.1
See application file for complete search history.

(56) References Cited

U.S. PATENT DOCUMENTS

| | | | | |
|---|---|---|---|---|
| 5,467,381 A | * | 11/1995 | Peltonen et al. | 455/432.1 |
| 5,467,382 A | * | 11/1995 | Schorman | 455/410 |
| 5,978,669 A | * | 11/1999 | Sanmugam | 455/410 |
| 6,449,479 B1 | * | 9/2002 | Sanchez | 455/433 |
| 6,600,916 B1 | * | 7/2003 | Verstraete | 455/410 |
| 2001/0044295 A1 | * | 11/2001 | Saito et al. | 455/410 |
| 2002/0022474 A1 | * | 2/2002 | Blom et al. | 455/410 |

FOREIGN PATENT DOCUMENTS

DE         198 18 846 A1    11/1999

* cited by examiner

*Primary Examiner* — Marivelisse Santiago Cordero
*Assistant Examiner* — Dung Hong

(57) ABSTRACT

A method for detecting the presence of fraudulent Subscriber Identity Modules in a network for cellular communications comprising the steps of: at a first Service Node, receiving a registration request by a first User Equipment comprising a Subscriber Identity Module for defining an identity of a subscriber; initiating a checking to establish whether the subscriber is already registered with the same identity in at least one Service Node over the network, including the first Service Node; if the subscriber results to be already registered with the same identity in at least a second Service Node over the network, retrieving status information on at least a second User Equipment associated with the already registered subscription for checking whether the second User Equipment is not the first User Equipment; and disabling any subscription of the subscriber associated with the identity if the second User Equipment results not to be the first User Equipment.

16 Claims, 5 Drawing Sheets

METHOD AND RADIO COMMUNICATION NETWORK FOR DETECTING THE PRESENCE OF FRAUDULENT SUBSCRIBER IDENTITY MODULES

FIELD OF THE INVENTION

The present invention relates to a method and a radio communication network for detecting the presence of fraudulent Subscriber Identity Modules.

BACKGROUND OF THE INVENTION

In modern mobile communications networks, such as second generation Global System for Mobile Communications (GSM) networks or third generation Universal Mobile Telecommunications System (UMTS) networks, mobile subscribers are univocally identified by an International Mobile Subscriber Identity (IMSI).

With reference to GSM networks, it is known that the IMSI is made up of three groups of codes, namely a three-digit Mobile Country Code (MCC) which identifies the country, a two-digit Mobile Network Code (MNC) which identifies the GSM network within that country, and a Mobile Station Identification Number (MSIN) of up to ten digits. The MSIN univocally identifies the subscriber within a network, while the group consisting of the MNC and the MSIN, which group is conventionally called National Mobile Subscriber Identity or NMSI, identifies the subscriber within a country.

The subscriber's identification codes, such as the IMSI, are usually stored in a smart card called Subscriber Identity Module (SIM), which is accommodated in the user equipment through which a subscriber benefits of various services provided by the network operator, first of all phone calls.

The ever increasing demand for mobile Internet and multimedia services has brought to the implementation of third generation (3G) networks such as the UMTS. UMTS networks are technically more advanced and allow for better performance, but the basic concepts and needs have remained the same, including the need of univocally identifying a subscriber in the network. In the case of UMTS networks, a Universal Subscriber Identity Module (USIM) is used, which is equivalent to the SIM card but suitably designed for third generation telephony.

The disclosure refers indifferently to 2G and 3G networks so that, from now on, the term SIM will indicate either a SIM or a USIM.

Notwithstanding more and more complex algorithms have been developed and used for encrypting data stored in or exchanged by the SIMs and the network, piracy continues to jeopardise secrecy of such data. In particular, a diffused piracy technique consists in fully cloning a SIM card, creating SIM cards which behave as the original card and are indistinguishable from the original card.

A user equipment on which a cloned SIM card is installed can access all the services that are accessible by the user equipment provided with the "original" SIM card, whereas the corresponding bills are charged to the legitimate subscriber.

The legitimate subscriber is usually not aware of fraudulent uses of his subscription, such as fraudulent mobile calls charged on his account. Even if he suspects that there may be an illegitimate beneficiary of his subscription, the GSM/UMTS network operator is nowadays unable to efficiently detect such fraudulent behaviour.

A possible solution to this problem is to examine the subscriber's phone call list attempting to spot fraudulent use, for example by noticing calls very close from a temporal point of view but originating and/or directed to Service Areas far away from each other or unusual for the subscriber.

This inspection would be a cumbersome one and would be unsuccessful in many cases, for instance when the cloned SIM is used in the same town as the legitimate one.

SUMMARY OF THE INVENTION

The aim of the present invention is to overcome the above mentioned problems, by providing an automatic mechanism which can determine whether a legitimate and an illegitimate Subscriber Identity Modules are used at the same time.

Within this aim, an object of the present invention is to provide a method for detecting the presence of fraudulent Subscriber Identity Modules which is independent of their location with respect to the Service Area serving the legitimate Subscriber Identity Module.

Another important object of the invention is to provide a method for detecting a fraudulent use of a subscription which does not make undue or unnecessary use of network resources.

Another object of the invention is to allow the network operator to quickly intervene in a compromised subscription as soon as an illegitimate SIM is detected.

A further object is to preserve the standard architecture of the radio communication networks without affecting the communications standards among the various entities interacting over the network.

Yet another object of the invention is to meet the needs of both the legitimate subscriber and the operator, by assuring the former that his subscription is always under surveillance and by satisfying the profit of the latter, the subscribers being encouraged in taking advantage of the operator's services if privacy and surveillance are guaranteed.

This aim, these objects and other which will become better apparent hereinafter are achieved by a method for detecting the presence of fraudulent Subscriber Identity Modules in a network for cellular communications comprising the steps of: at a first Service Node, receiving a registration request by a first User Equipment comprising a Subscriber Identity Module for defining an identity of a subscriber; initiating a checking to establish whether the subscriber is already registered with the same identity in at least one Service Node over the network, including the first Service Node; if the subscriber results to be already registered with the same identity in at least a second Service Node over the network, retrieving status information on at least a second User Equipment associated with the already registered subscription for checking whether the second User Equipment is not the first User Equipment; and disabling any subscription of the subscriber associated with the identity if the second User Equipment results not to be the first User Equipment.

The aim and the objects of the invention are also achieved by a radio communication network for detecting the presence of fraudulent Subscriber Identity Modules comprising Service Nodes having mobility management capabilities, characterised in that it comprises: at a first Service Node, means for receiving a registration request by a first User Equipment comprising a Subscriber Identity Module for defining an identity of a subscriber; means for initiating a checking to establish whether the subscriber is already registered with the same identity in at least one Service Node over the network, including the first Service Node; retrieving means for retrieving status information on at least a second User Equipment associated with the already registered subscription, the retrieving means being set so as to be activated if the subscriber results to be already registered with the same identity in at least a second Service Node over the network; checking means for checking whether the at least a second User Equipment is not the first User Equipment; and means for disabling any subscription of the subscriber associated with the identity, the means for disabling being set so as to be activated if the outcome of the checking means is that the at least a second User Equipment is not the first User Equipment.

According to one embodiment of the invention, the second Service Node is different from the first Service Node, whether in the same network or in a different network or country. In this case, the means for initiating a checking to establish whether the subscriber is already registered with the same identity in at least one Service Node over the network are located at the Home Location Register of the subscriber. Said means are preferably programmed so that the initiating step comprises the step of performing a Location Update towards the Home Location Register associated with the subscriber in response to the registration request by the first User Equipment. The retrieving step comprises the steps of asking the second Service Node for Current Location information and of rejecting the registration request by the first User Equipment if the Current Location information is returned to the Home Location Register.

According to another embodiment of the invention, the second Service Node is the first Service Node. In this case, the means for initiating a checking to establish whether the subscriber is already registered with the same identity in at least one Service Node over the network are located at the first Service Node and the retrieving step preferably comprises the steps of checking whether the already registered subscriber is in idle mode; issuing a Global Paging from the first Service Node directed to the User Equipments served by the first Service Node, if the already registered subscriber is in idle mode, and then checking whether at least two Paging Responses are received by the first Service Node in response to the Global Paging, the second User Equipment resulting not to be the first User Equipment should at least two Paging Responses be received.

Advantageously, the method according to the invention may additionally comprise the step of checking whether the already registered subscriber is in busy mode. In this case, the second User Equipment results not to be the first User Equipment if the already registered subscriber is in busy mode. In this case, the registration request is rejected by the first User Equipment and the ongoing call is dropped.

According to further details of the present invention, the Home Location Register associated with the subscriber is provided with an indicator stored therein and associated with the subscriber, the indicator being set by the subscriber for activating or deactivating the detecting method. The indicator is preferably uploaded to any Visitor Location Register where the Subscriber Identity Module registers.

Preferably, when the disabling step is performed, the subscriber is de-registered a Mobile Application Part (MAP) "Purge" Message is sent to the Home Location Register for purging the first User Equipment and an alarm report is issued at the Home Location Register to alert operator personnel. The Purge MAP Message preferably comprises an additional parameter indicating that a cloned Subscriber Identity Module has been detected, the Serving Node being the Mobile Switching Center.

Service Nodes may be any one of a Mobile Service Switching Center, a Visitor Location Register and a Home Location Register, and the radio communication network may be any one of a 2G or 3G mobile communication network.

A user equipment in the context of the invention may be a mobile station, a computing device comprising or connected to means for wireless telecommunications, or a handset adapted to provide mobile telecommunications, in which an identification module comparable to a SIM or USIM is particularly installed.

BRIEF DESCRIPTION OF THE DRAWINGS

Further characteristics and advantages of the invention will become better apparent from the following description of preferred but not exclusive embodiments, illustrated by way of non-limitative embodiments in the accompanying drawings, wherein.

DETAILED DESCRIPTION OF THE INVENTION

Figure 1:
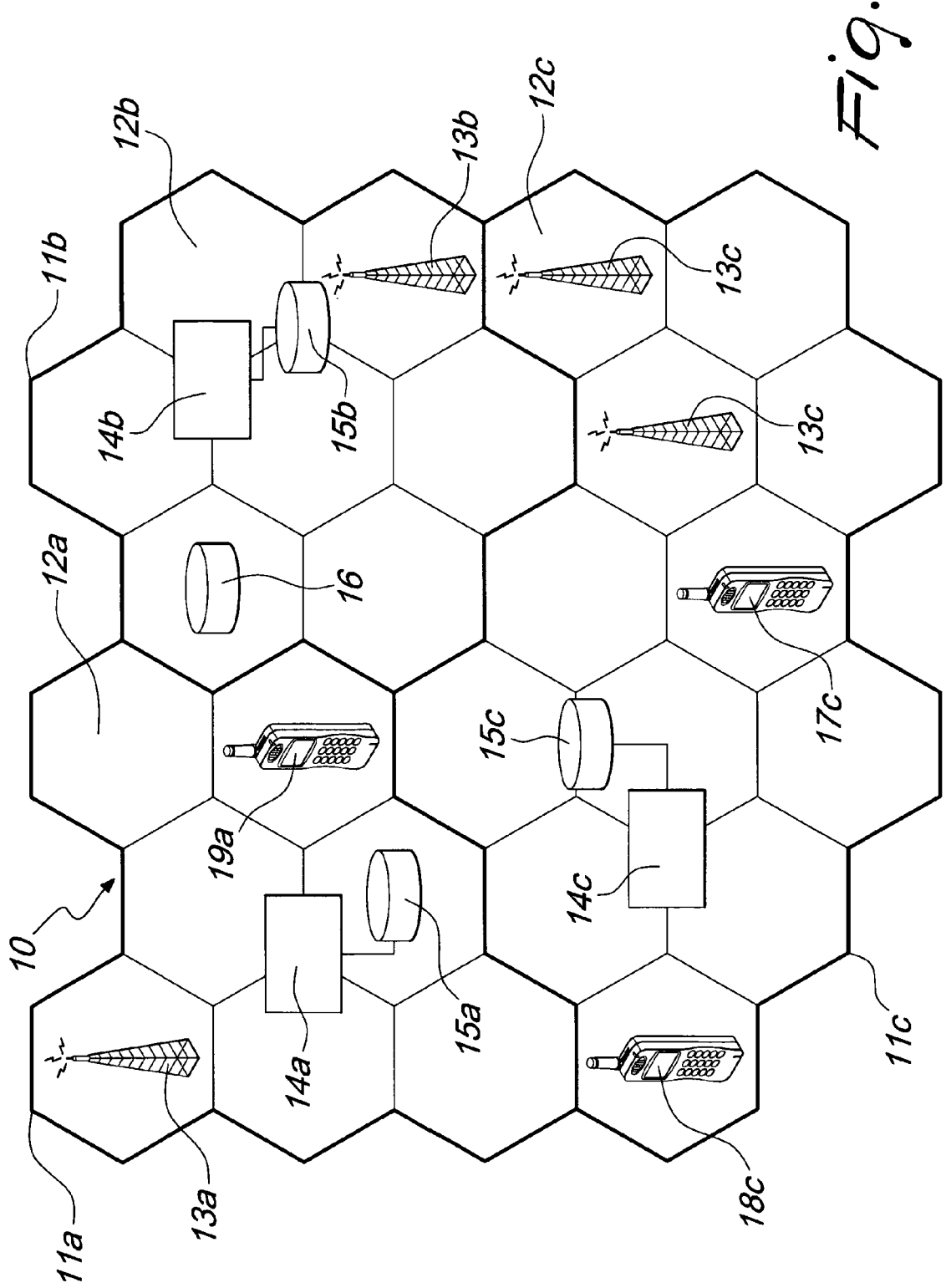
FIG. 1 is a schematic drawing of a portion of a GSM mobile communication network.

A typical and conventional mobile cellular network 10 is shown in FIG. 1. The network 10 is for instance a second generation Global System for Mobile Communications (GSM) Public Land Mobile Network (PLMN) or a third generation Universal Mobile Telecommunications System (UMTS) network. However, the same inventive concept may apply to any existing or forthcoming new generation networks, as long as the general architecture remains substantially the same.

Network 10 comprises a plurality of cells 12a, 12b, 12c, which are associated with at least one Base Station Subsystem 13a, 13b, 13c, schematically represented by a tower antenna, and grouped so as to form MSC Service Areas 11a, 11b and 11c associated with a geographical zone. The cells are depicted as being ideally complementary to each other, but in practice they may partially overlap to each other and be of any shape.

The MSC Service Areas are served by Visitor Location Registers (VLRs), for instance VLRs 15a, 15b, 15c, which are preferably comprised or connected to at least one service node, in particular at least to a Mobile Services Switching Center (MSC) 14a, 14b and 14c.

The basic function of an MSC/VLR is to switch speech and data connections between Base Station Controllers (BSCs), other MSCs, other networks and external non-mobile networks. The MSC/VLR also handles a number of functions associated with mobile subscribers, among others registration, location updating and handover between a user equipment and the Public Land Mobile Network (PLMN).

The VLR stores data about all the users that are roaming within the MSC Service Area of the corresponding MSC. This data is updated through a location update procedure initiated from the user equipment of each customers via the MSC, or directly from the subscriber's home service node, such as Home Location Register (HLR) or Home Subscriber Server (HSS) 16.

The HLR/HSS is the home register of the subscriber, which particularly stores information about the subscription, the subscriber's identification data and profile, the services which are allowed to the subscriber and the subscriber's location. When the subscriber roams into the MSC Service Area of an MSC different from the home MSC, the HLR/HSS is updated accordingly.

The skilled in the art easily appreciates that the HLR/HSS 16, which is shown in FIG. 1 as a separate entity, may be also positioned within any MSC/VLR and may serve several service nodes.

In the preferred embodiments of the invention, the subscriber's profile stored in the HLR 16 comprises a particular indicator which can be set by the legitimate subscriber who suspects that his SIM has been cloned or cracked. This indicator is hereinafter referred to as "Suspected Cloned SIM".

The Suspected Cloned SIM indicator is uploaded to the VLRs where the subscriber is currently registered by means of the known Mobile Application Part (MAP) operation called INSERT_SUBSCRIBER_DATA. In particular, with reference to the MAP Technical Specification no. 29.002 of the 3rd Generation Partnership Project, release 6 (TS 3GPP 29.002 v6.5.0), the subscriber management type insertSubscriberDataArg is modified by adding the parameter suspectedClonedSIM as indicated in the following Table 1.

cloned SIM/USIM card installed, is located in the same MSC Service Area 11c, so that both the legitimate and the illegitimate user equipments are to be served by the same MSC 14c.

A second illegitimate user equipment 19a is instead depicted as located in Service Area 11a, so that the Service Nodes serving the legitimate and the illegitimate user equipments are different.

Even though they are not depicted in the figures, various arrangements of the user equipments may be provided, provided that a checking for possible identical registrations in the network is performed as soon as a registration request from a first user equipment is received at any Service Node. For instance, two user equipments may be located in different core networks or in different countries.

Figure 2:
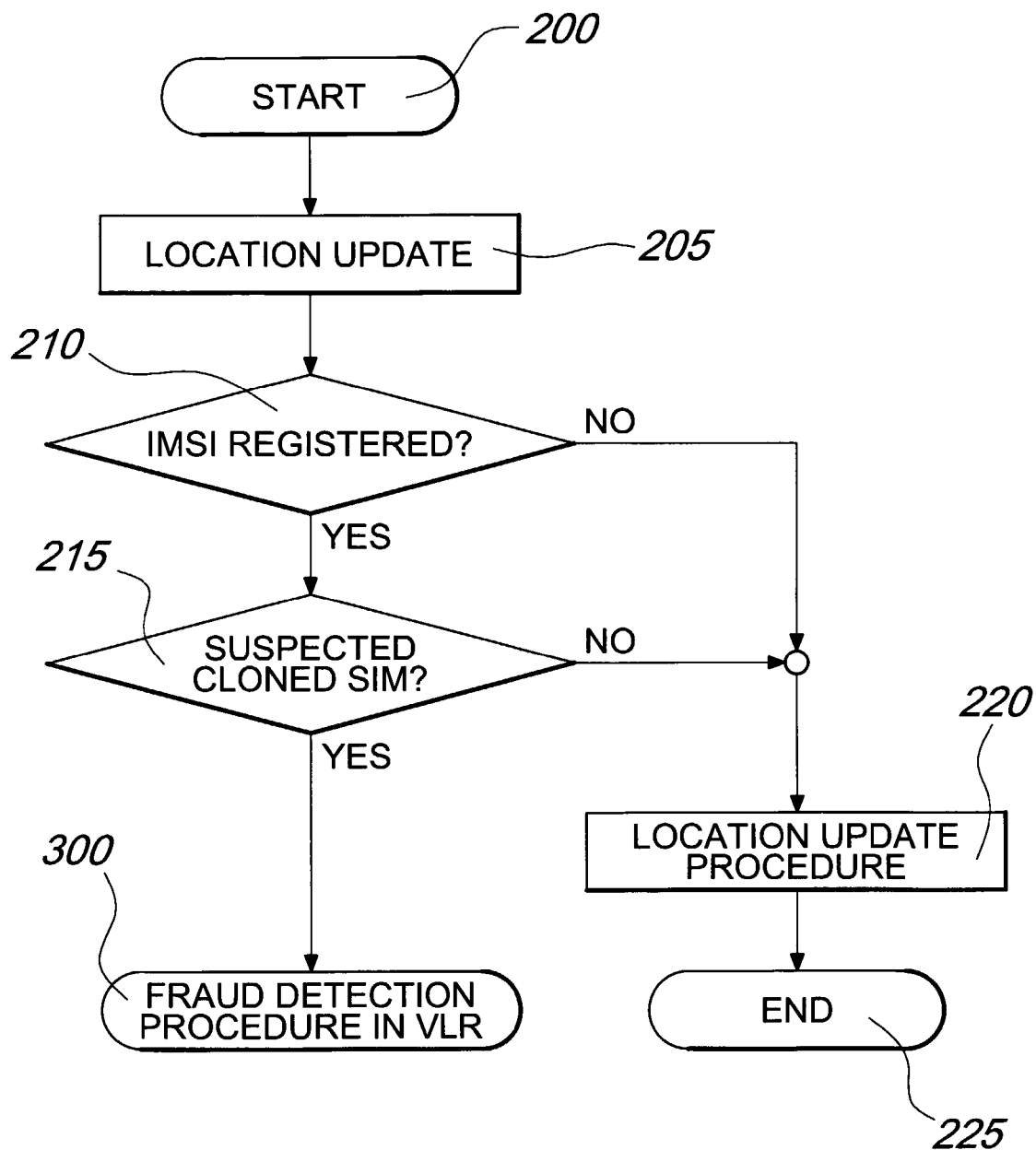
FIG. 2 is a flow diagram of a step of initiating the fraud detection checking at a Mobile Service Switching Center, according to a first embodiment of the invention.

According to a first embodiment of the invention and with reference to FIG. 2, a procedure for initiating a checking on whether a first user equipment 18c trying to register with the MSC/VLR 14c is already registered with the same identity in another MSC is started at step 200, supposing that such first user equipment is user equipment 18c.

As soon as the user equipment 18c enters or is switched on in Service Area 11c, a conventional Location Update procedure 205 is performed. In this procedure, the user equipment

TABLE 1

```
InsertSubscriberDataArg ::= SEQUENCE {
    imsi                              [0] IMSI                              OPTIONAL,
    COMPONENTS OF                     SubscriberData,
    extensionContainer                [14] ExtensionContainer               OPTIONAL,
    ...,
    naea-PreferredCI                  [15] NAEA-PreferredCI                 OPTIONAL,
    -- naea-PreferredCI is included at the discretion of the HLR operator.
    gprsSubscriptionData              [16] GPRSSubscriptionData             OPTIONAL,
    roamingRestrictedInSgsnDueToUnsupportedFeature [23]                     NULL
                                                                            OPTIONAL,
    networkAccessMode                 [24] NetworkAccessMode                OPTIONAL,
    lsaInformation                    [25] LSAInformation                   OPTIONAL,
    lmu-Indicator                     [21] NULL                             OPTIONAL,
    lcsInformation                    [22] LCSInformation                   OPTIONAL,
    istAlertTimer                     [26] IST-AlertTimerValue              OPTIONAL,
    superChargerSupportedInHLR        [27] AgeIndicator                     OPTIONAL,
    mc-SS-Info                        [28] MC-SS-Info                       OPTIONAL,
    cs-AllocationRetentionPriority    [29] CS-AllocationRetentionPriority
    OPTIONAL,
    sgsn-CAMEL-SubscriptionInfo       [17] SGSN-CAMEL-SubscriptionInfo      OPTIONAL,
    chargingCharacteristics           [18] ChargingCharacteristics          OPTIONAL,
    accessRestrictionData             [19] AccessRestrictionData            OPTIONAL,
    suspectedClonedSIM                [20] NULL                             OPTIONAL
}
    -- If the Network Access Mode parameter is sent, it shall be present only in
    -- the first sequence if segmentation is used
```

In the following it is assumed that a Suspected Cloned SIM indicator exists and is set in the HLR 16. Obviously, the invention can operate even without a Suspected Cloned SIM indicator, should the fraud detection features be set by default.

The fraud detection procedure and network according to the invention refers to two main cases. The first case relates to an arrangement in which two user equipments having respectively a legitimate SIM and a corresponding illegitimate SIM are displaced in the same MSC service area served by the same MSC.

The second case relates instead to the situation in which the two SIMs are located in different MSC Service Areas.

An exemplification of these two cases is illustrated in FIG. 1. A legitimate user equipment 17c, i.e. a user equipment supplied with the legitimate or original SIM/USIM card, is located in the MSC Service Area 11c. A first illegitimate user equipment 18c, i.e. a user equipment having an illegitimate or

18c communicates, by means of the Base Station Subsystem responsible for the cell visited by the user equipment, its location and identification data to the MSC 14c, in order to update the database stored in the VLR 15c.

At step 210, it is checked whether the IMSI associated with user equipment 18c is already present in the VLR 15c, thus verifying whether the subscriber associated with such IMSI is currently already registered with a same identity.

If no identical IMSI is found, the Location Update procedure carries on in a conventional manner at step 220, the VLR 15c is updated by registering the subscriber's IMSI and the procedure is then terminated at step 225.

On the contrary, if an identical IMSI is found in the VLR 15c, at step 215 the system checks whether the Suspected Cloned SIM indicator is set for the subscriber. If so, a fraud detection procedure 300 is started, otherwise the Location Update procedure is again completed at steps 220 and 225.

Figure 3:
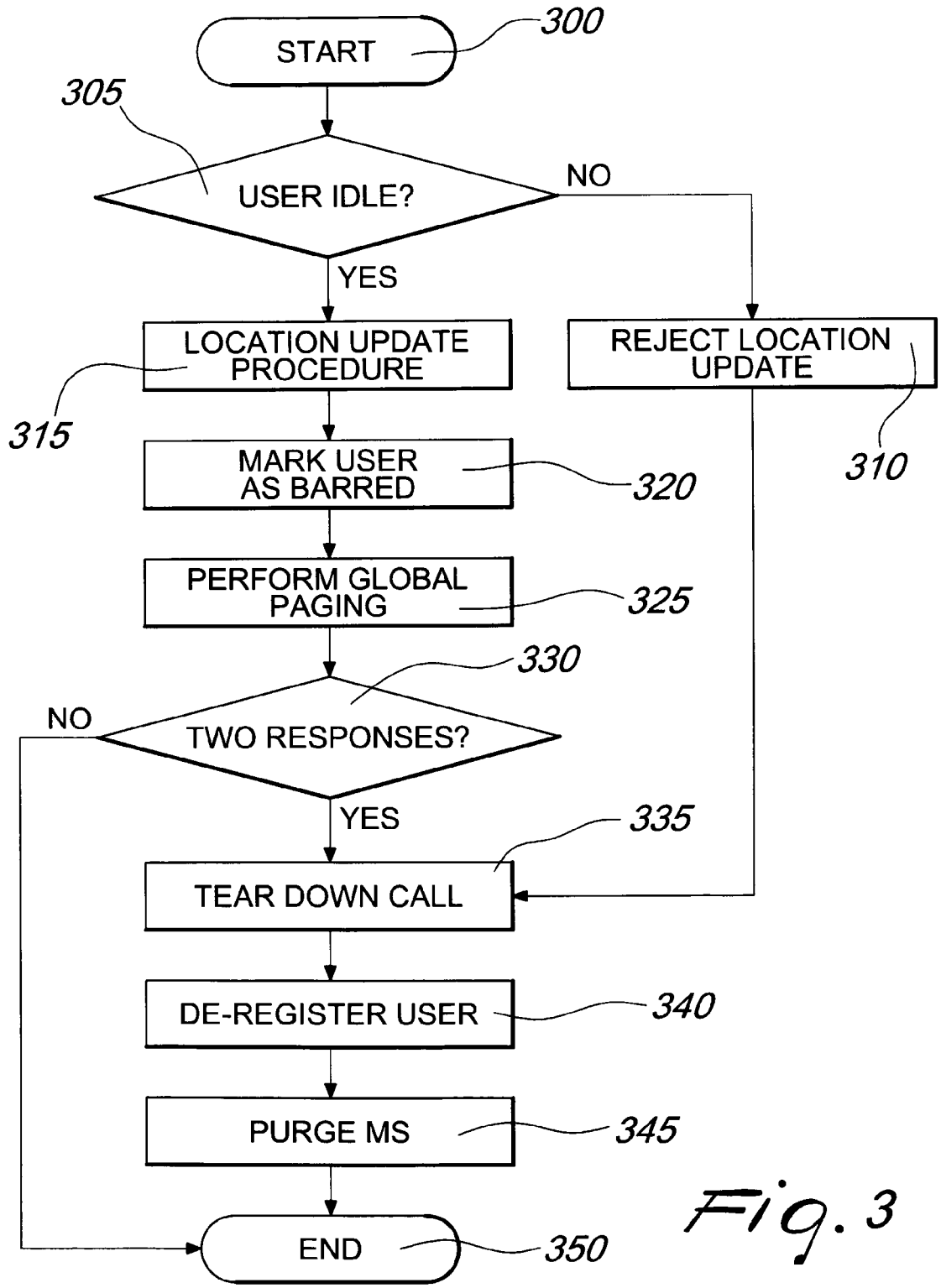
FIG. 3 is a flow diagram of a particular fraud detection method according to the first embodiment of the invention.

The fraud detection procedure 300, as detailed in FIG. 3, comprises the step of retrieving status information on a possible second user equipment 17c, i.e. a second SIM/USIM, which may be present in the Service Area visited by the first user equipment 18c.

In certain circumstances, even though an identical IMSI is present in the VLR 15c, this may be caused by an improper or late updating of the VLR itself, a situation which has to be handled to avoid raising of false alarms and undue service interruptions.

Upon starting of the retrieving procedure at step 300, a check is performed at step 305 to detect whether the second user equipment 17c is idle or busy, e.g. in conversation.

If the second user equipment 17c is busy, a cloning has certainly occurred, in that two cards identified by the same IMSI are reported to be in a different status. Therefore, at step 310 the location update of the first user equipment 18c is rejected and, at step 335 the subscriber's 17c ongoing call is dropped and the procedures jumps to step 340. Preferably, before dropping the ongoing call, a further check is carried out at step 335 for verifying that such ongoing call is an Emergency call. If so, the procedure is suspended until the Emergency call is closed by the user.

Then, at step 340, the user is de-registered and a MAP operation Purge-MS message is sent to the HLR 16 with an additional "Cloned SIM Detected" parameter at step 345, so that the HLR 16 may take any appropriate action to disable the cards. In particular, with reference to the Technical Specification TS 3GPP 29.002 v6.5.0, the location registration data type PurgeMS-Arg is modified as shown in the following Table 2.

TABLE 2

PurgeMs-Arg ::= [3] SEQUENCE {
    imsi                IMSI,
    vlr-Number      [0] ISDN-AddressString   OPTIONAL,
    sgsn-Number     [1] ISDN-AddressString   OPTIONAL,
    extensioncontainer ExtensionContainer     OPTIONAL,
    ...,
    clonedSIM-Detected [2] NULL               OPTIONAL}

In the case that an identical IMSI is found in the VLR 15c and that, at step 305, the user equipment 17c of a second user is found to be idle, it must be ensured that two identical SIMs are actually being detected before any further action is taken to prevent fraudulent use.

In this regard, the location update procedure is carried out at step 315 and the requested registration is allowed and performed.

However, at step 320 the user equipment 18c is put in a barred state, and the user is not allowed to make any mobile generating calls with the exception, for safety reasons, of emergency calls.

At step 325, a Global Paging is issued by the MSC/VLR 14c and, at step 330, the number of responses received in reply to the Global Paging request is checked by the MSC/VLR 14c.

If only one response is received, then the presence in the VLR 15c of two identical IMSI codes is to be ascribed to normal delays in operation, and the system understands that no SIM has been cloned, thus ending the anti-fraud procedure at step 350 and reinstating the user 18c to his normal state.

Should two or more paging responses be returned to the MSC/VLR 14c, any call request is torn down and the procedure continues from step 335 as already described.

Figure 4:
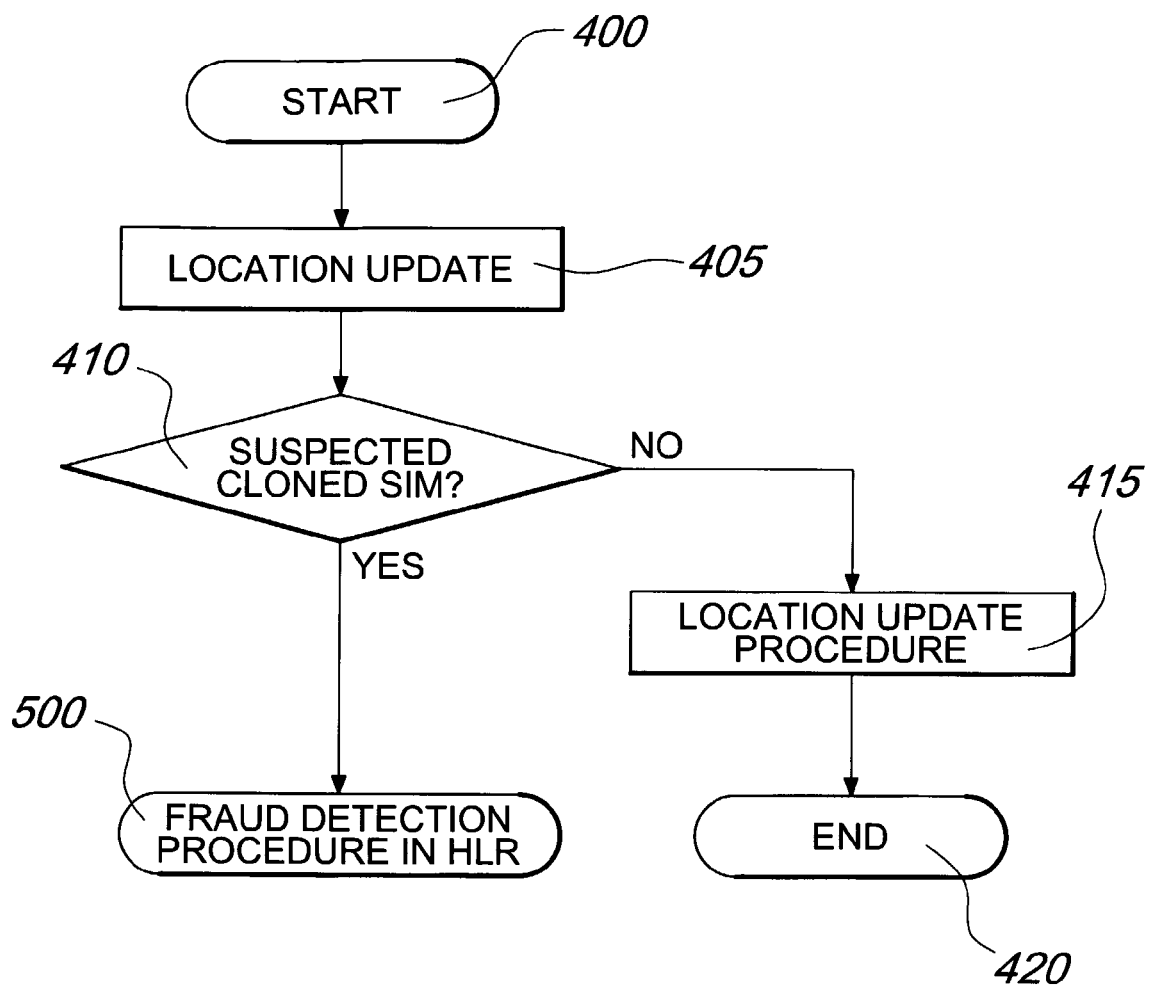
FIG. 4 is a flow diagram of a step of initiating the fraud detection checking at a Home Location Register, according to a second embodiment of the invention.

With reference now to FIG. 4, when the legitimate SIM and the cloned one are active in different MSC Service Areas 11a-11c, the procedure for detecting a cloned SIM can not be performed inside an MSC/VLR 14c but must be carried out by the HLR 16, which is always contacted by the MSC when registering a subscriber, regardless of the country or network from which the subscriber is trying to register.

As soon as user equipment 19a enters or is switched on in a Service Area 11a, a conventional Location Update procedure 405 is started.

In this procedure, the user equipment 19a communicates, by means of the Base Station Subsystem responsible for the cell visited by the user equipment 19a, its location and identification data to the MSC 14a in order to update the database stored in the VLR 15a. The MSC 14a performs in turn an Update Location procedure towards the HLR 16, which checks if the indicator "Suspected Cloned SIM" is set for the subscriber corresponding to the received data.

If so, at step 410, it is checked whether the IMSI associated with user equipment 19a is already present in one of the VLRs reachable by the HLR 16, in which case the fraud detection procedure associated with a status information retrieving procedure 500 is started, otherwise the Location Update procedure is completed at steps 415 and 420.

Figure 5:
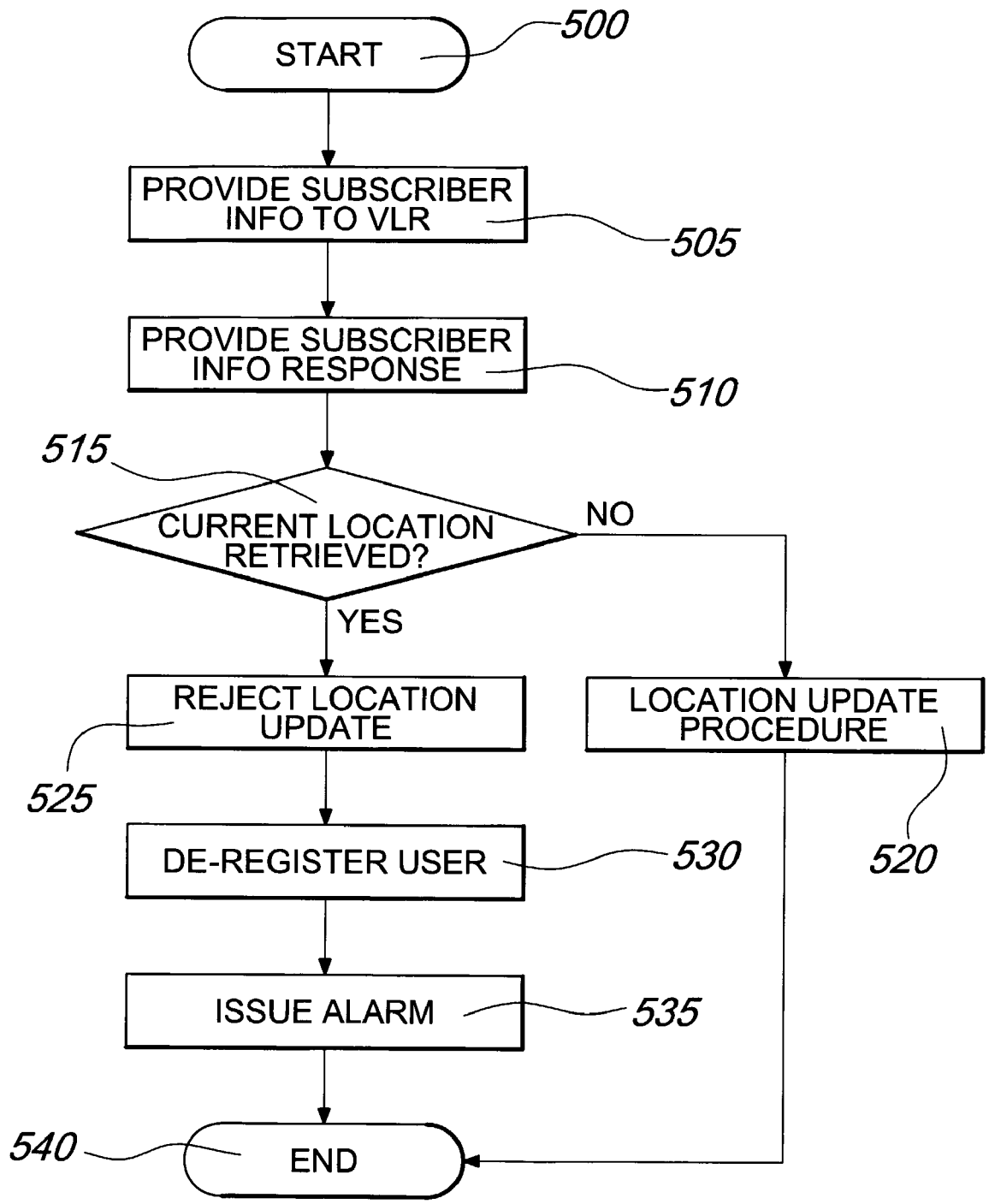
FIG. 5 is a flow diagram of a fraud detection method according to the second embodiment of the invention.

With reference to FIG. 5, at step 505 the HLR 16 sends a MAP operation "Provide Subscriber Info" asking the MSC/VLR 14c inside which an IMSI identical to the caller's IMSI was found for Current Location information of the user equipment 17c.

On response to such message, the MSC/VLR checks whether the user equipment corresponding to the IMSI is idle, by issuing a Paging request to the user equipment 17c. If the user equipment 17c answers the Paging request, the MSC/VLR 14c sends a "Provide Subscriber Info response" to the HLR 16, including the "Current Location Retrieved" parameter, at step 510.

Instead, should the user equipment 17c be busy, the same message is immediately returned from the MSC/VLR 14c to the HLR 16, the Paging request to the user equipment 17c being unnecessary in this case.

At step 515, the HLR 16 checks whether a Current Location has been returned by the MSC/VLR 14c for user equipment corresponding to the suspected cloned SIM, in which case the Location Update procedure of user equipment 19a is rejected at step 525, the user is de-registered at step 530 and an alarm is raised at step 535 by the HLR 16 so as to alert operator personnel that a cloned SIM has been detected.

On the other hand, should the outcome at step 515 be negative, no SIM cloned has occurred and the Location Update procedure is completed conventionally at step 520 and is terminated at step 540.

The skilled in the art easily understands that the above described steps may be performed by computer hardware, software, or a combination of computer hardware and software and telecommunication means programmed through conventional techniques in order to take into account the additional information data needed by the present invention.

A combination of CPU, memory and communications means, well in the reach of the skilled in the art, is required in order to perform the steps according to the invention. The invention is therefore preferably implemented by introducing new functionality in existing systems, which enhancements are clearly in the reach of the average technician and are not hereby discussed in detail. Therefore, the average technician will have no difficulty in modifying and programming the functionality of an existing system so that the system comprises means for receiving a registration request by a first User Equipment, means for initiating a checking to establish whether the subscriber is already registered with the same identity in at least one Service Node over the network, retrieving means for retrieving status information on at least a second User Equipment associated with the already registered subscription, checking means for checking whether the at least a second User Equipment is not the first User Equipment, and means for disabling any subscription of the subscriber associated with the identity, to be activated if the outcome of the checking means is that the at least a second User Equipment is not the first User Equipment.

It has thus been shown that the present invention fulfills the proposed aim and objects. Clearly, several modifications will be apparent to and can be readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

The invention claimed is:

1. A method for detecting the presence of fraudulent Subscriber Identity Modules in a network for cellular communications the method comprising the steps of:
   (a) at a Service Node, receiving a registration request by a first User Equipment comprising a Subscriber Identity Module for defining an identity of a subscriber;
   (b) determining whether the subscriber is already registered with the same identity in the Service Node,
   (c) if the subscriber is already registered with the same identity in the Service Node, retrieving status information on at least a second User Equipment associated with the already registered subscriber for determining whether said at least second User Equipment is different than the first User Equipment, by:
   determining whether the already registered subscriber is in idle mode;
   in response to determining that the already registered subscriber is in idle mode, issuing a Global Paging from said Service Node directed to the User Equipments served by said Service Node and checking whether at least two Paging Responses are received by the Service Node in response to said Global Paging, the second User Equipment determined not to be the first User Equipment should at least two Paging Responses be received,
   (d) disabling any subscription of the subscriber associated with said identity if said at least second User Equipment is determined to be different than the first User Equipment,
   (e) de-registering the subscriber,
   (f) sending a Purge Mobile Application Part Message to a Home Location Register associated with said subscriber for purging said first User Equipment and
   (g) issuing an alarm report to operator personnel.

2. The method of claim 1, wherein said retrieving step further comprises:
   checking whether the already registered subscriber is in busy mode, the second User Equipment being determined to be different than the first User Equipment if the already registered subscriber is in busy mode.

3. The method of claim 2, further comprising the steps of rejecting the registration request by the first User Equipment and
   dropping the ongoing call, if the already registered subscriber is in busy mode.

4. The method of claim 1, wherein said Service Node is a Mobile Service Switching Center.

5. The method of claim 1 comprising the step of
   providing the Home Location Register associated with said subscriber with an indicator stored therein and associated with said subscriber, said indicator being set by the subscriber for activating or deactivating said detecting method.

6. The method of claim 5, wherein said indicator is downloaded to any Visitor Location Register where the Subscriber Identity Module registers.

7. The method of claim 1, wherein said Purge Mobile Application Part Message comprises an additional parameter indicating that a cloned Subscriber Identity Module has been detected.

8. The method of claim 1, wherein the first User Equipment is put in a barred state that only allows emergency calls.

9. A Service Node for detecting the presence of fraudulent Subscriber Identity Modules, comprising:
   means for receiving a registration request by a first User Equipment comprising a Subscriber Identity Module for defining an identity of a subscriber;
   means for initiating a checking to establish whether the subscriber is already registered with the same identity in the Service Node;
   retrieving means for retrieving status information on at least a second User Equipment associated with the already registered subscription, said retrieving means being set so as to be activated if the subscriber is already registered with the same identity in the Service Node, wherein said retrieving means are set so as
   to check whether the already registered subscriber is in idle mode and,
   in response to determining that the already registered subscriber is in idle mode, to issue a Global Paging from said Service Node directed to the User Equipments served by said Service Node and to check whether at least two Paging Responses are received by the Service Node in response to said Global Paging, the second User Equipment determined to be different than the first User Equipment should at least two Paging Responses be received;
   checking means for checking whether said at least a second User Equipment is different than the first User Equipment;
   means for disabling any subscription of the subscriber associated with said identity, said means for disabling being set to be activated if the outcome of said checking means is that said at least a second User Equipment is different than the first User Equipment, and
   wherein said disabling means comprises:
   means for de-registering the subscriber,
   means for sending a Purge Mobile Application Part Message for purging said first User Equipment and
   means for issuing an alarm report to operator personnel.

10. The Service Node of claim 9, wherein said retrieving means are set so as to perform the step of checking whether the already registered subscriber is in busy mode, the second User Equipment being determined to be different than the first User Equipment if the already registered subscriber is in busy mode.

11. The Service Node of claim 10, wherein said disabling means further comprises:
   means for rejecting the registration request by the first User Equipment and
   means for dropping the ongoing call, if the already registered subscriber is in busy mode.

12. The Service Node of claim 9, wherein said Service Node is a Mobile Service Switching Center.

13. The Service Node of claim 9, further comprising a Home Location Register associated with said subscriber comprising an indicator stored therein and associated with said subscriber, said indicator being representative of activating or deactivating said means for initiating a checking.

14. The Service Node of claim 13, wherein said indicator is downloadable to any Visitor Location Register where the Subscriber Identity Module registers.

15. The Service Node of claim 9, wherein said Purge Mobile Application Part Message comprises an additional parameter representative of a detected cloned Subscriber Identity Module alert.

16. The Service Node of claim 9, wherein the Service Node is adapted to put the first User Equipment in a barred state that only allows emergency calls.

* * * * *